United States Patent Office 3,185,719
Patented May 25, 1965

3,185,719
ORGANOSILICON COMPOUNDS CONTAINING NITRILE RADICALS
Maurice Prober, Fairfield, Conn., assignor to General Electric Company, a corporation of New York
No Drawing. Filed Dec. 31, 1953, Ser. No. 401,704
8 Claims. (Cl. 260—448.2)

This invention relates to organosilicon compounds containing both hydrolyzable groups and cyanoalkyl radicals attached to silicon. More particularly, this invention is concerned with cyanoalkyl organosilicon compounds of the formula:

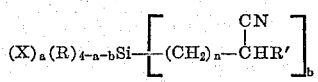

$$(X)_a(R)_{4-a-b}Si\left[-(CH_2)_n-\overset{CN}{\underset{|}{C}}HR'\right]_b$$

where X is a hydrolyzable group, for example, halogen, e.g., chlorine, bromine, etc.; alkoxy radicals, e.g., methoxy, ethoxy, propoxy, butoxy, etc., radicals; aryloxy radicals, e.g., phenoxy, etc., radicals; acyloxy radicals, e.g., acetoxy, propionoxy, etc., radicals; R and R' are non-hydrolyzable members selected from the class consisting of hydrogen, alkyl radicals, e.g., methyl, ethyl, propyl, butyl, etc., radicals; aryl radicals, e.g., phenyl, biphenyl, tolyl, xylyl, etc., radicals; aralkyl radicals, e.g., benzyl, phenylethyl, etc., radicals and mixtures of the aforesaid members; $n$ is a whole number equal to from zero to 10, inclusive, and preferably $n$ is a whole number equal to from zero to 4, inclusive; $a$ is an integer equal to from 1 to 3, inclusive, and $b$ is an integer equal to from 1 to 2, inclusive, the sum of $a+b$ being equal to at most 4. Where there is more than one R present in the above compound, the various R groups may be the same or different (i.e., mixed) groups.

The compounds of the present invention may be described generally as having at least one nitrile radical attached to silicon through aliphatic carbon and at least one hydrolyzable group attached directly to silicon, with any remaining valences of silicon being satisfied by members selected from the class consisting of hydrogen, alkyl radicals, aryl radicals, aralkyl radicals, and mixtures of the aforesaid members.

The methyl alpha-cyanoisopropyl hydrolyzable silanes are disclosed and claimed in the copending application of Quentin P. Cole Serial No. 401,690, filed concurrently herewith now U.S. Patent 2,776,306, and assigned to the same assignee as the present invention.

β-Cyanoalkyl compounds within the scope of the present invention include, for example, β-cyanoethyltrichlorosilane, β - cyanopropyltrichlorosilane, β - cyanobutyltrichlorosilane, β-cyanoethyltriethoxysilane, methyl-β-cyanoethyldichlorosilane, methyl - β - cyanoethyldimethoxysilane, methyl-β-cyanoethyldiacetoxysilane, methyl-β-cyanopropyldichlorosilane, methyl-β-cyanopropyldimethoxysilane, bis-(β-cyanoethyl)-dichlorosilane, methyl-β-cyanopropyldiacetoxysilane, phenyl-β-cyanoethyldichlorosilane, dimethyl - β - cyanoethylchlorosilane, methylphenyl-β-cyanopropylmethoxysilane. Other cyanoalkyl compounds within the scope of the invention include, for example, cyanomethyltrichlorosilane, methylcyanomethyldimethoxysilane, ω-cyanopropyltriethoxysilane, ethyl-ω-cyanobutyldichlorosilane, α-cyanoethyltrichlorosilane, methyl-α-cyanoethyldichlorosilane, cyanomethyldichlorosilane, etc.

Compounds corresponding to Formula 1 are useful in the preparation of oils, rubbers and resins. For example, mixtures of compounds having one, two and three hydrolyzable groups attached to silicon may be copolymerized by usual methods to form resins useful in coating applications. Compounds containing two hydrolyzable groups may be hydrolyzed to long chain oils which are chain-stopped with compounds containing one hydrolyzable group. These oils are valuable as lubricants in high temperature applications. Rubbers may also be prepared from the compounds of the present invention by the usual methods. The oils, resins and rubbers prepared from the compounds of Formula 1 are unusual in that they contain the polar —C≡N radical attached to silicon through aliphatic carbon. This polar radical tends to make the products insoluble in hydrocarbon solvents and, therefore, valuable in applications where the products come into contact with hydrocarbon compounds.

The compounds of the present invention may be prepared by relatively simple means using available compounds. For example, the compounds containing three hydrolyzable groups attached to silicon may be prepared by the method disclosed in the copending application of Maurice Prober, Serial No. 401,702, filed concurrently herewith, now U.S. Patent 3,099,670, and assigned to the same assignee as the present invention. For example, β-cyanoethyltrichlorosilane may be prepared by refluxing trichlorosilane and acrylonitrile in the presence of tri-n-butylamine. β-Cyanopropyltrichlorosilane may be prepared by refluxing trichlorosilane with methacrylonitrile in the presence of tri-n-butylamine. β-Cyanobutyltrichlorosilane may be prepared by refluxing trichlorosilane with α - ethylacrylonitrile. α-Cyanoethyltrichlorosilane may be prepared by reaction between trichlorosilane and acrylonitrile at superatmospheric pressures and elevated temperatures. Cyanoalkylsilanes of the formula containing two hydrolyzable groups and one non-hydrolyzable group may be preparmed advantageously from the cyanoalkyltrichlorosilanes of the present invention. One of the chlorines of the cyanoalkyltrichlorosilane may be replaced with a non-hydrolyzable radical by a Grignard synthesis or by reaction with a dialkylcadmium. For example, methyl-β-cyanoethyldichlorosilane may be prepared by refluxing β - cyanoethyltrichlorosilane with methyl magnesium bromide, and the same compound may be prepared by reacting β-cyanoethyltrichlorosilane with dimethylcadmium. Preferably, the dialkylcadmium synthesis is used since this gives a cleaner reaction without affecting the nitrile radical. The dialkoxy, diaryloxy and diacyloxy compounds of the present invention may be prepared from the dichlorocompounds by reacting the dichloro compound with a suitable alcohol, phenol, acid, or anhydride. For example, methyl-β-cyanoethyldimethoxysilane may be prepared from methyl-β-cyanoethyldichlorosilane and methanol in the presence of pyridine. Methyl-β-cyanoethyldiacetoxysilane may be prepared by reacting methyl-β-cyanoethyldichlorosilane with acetic anhydride in the presence of a lower tertiary alkyl amine. Cyanoalkylsilanes having only one hydrolyzable group may be prepared advantageously from cyanoalkylsilanes containing two chlorines attached directly to silicon by the dialkylcadmium synthesis described above which replaces one of the chlorine atoms with an alkyl radical. Bis-cyanoalkylsilanes may be formed by adding two moles of acrylonitrile to one mole of dichlorosilane in the presence of a tertiary amine such as tri-n-butylamine at superatmospheric pressures and elevated temperatures.

The following examples are illustrative of the compounds prepared according to the practice of my invention and are not intended for purposes of limitation.

*Example 1*

β-Cyanoethyltrichlorosilane was prepared by slowly adding 106.0 grams (2.00 moles) of acrylonitrile to a solution of 18.9 grams (0.1 mole) of tri-n-butylamine in 271.0 grams (2.00 moles) of trichlorosilane. The solution was then refluxed for 24 hours and the reaction mixture was distilled until the boiling point of the residue reached 100° C. The residue was then vacuum distilled and 267.2 grams of a fraction distilling at 72 to 102° C. at 10 to 11 mm. was collected. Most of this fraction boiled between 87 and 91° C. This fraction solidified at room temperature and an upper liquid layer of 11.5 grams was decanted off. The remainder was rectified and there was obtained 212.3 grams of β-cyanoethyltrichlorosilane boiling at 92.5° C. at 13 mm. to 83° C. at 7 mm. Analysis of the product showed it to contain 7.44% nitrogen; and 56.4% chlorine. (Theoretical: 7.43% nitrogen and 56.53% chlorine.)

Example 2

β-Cyanopropyltrichlorosilane was prepared by charging 536.6 grams (8.00 moles) of methacrylonitrile and 74.2 grams (0.400 mole) of tri-n-butylamine to a three-necked flask equipped with a thermometer, dropping funnel, stirrer, and a reflux condenser. Over a one and one-half hour period 1084 grams (8.00 moles) of trichlorosilane was added to the stirred solution. The solution was refluxed for 112 hours until a pot temperature of 97° C. was reached. After the solution had cooled, 0.400 mole of anhydrous hydrogen chloride was passed into the stirred solution. The reaction mixture was then distilled yielding 859.1 grams of a fraction boiling between 70 and 145° C. at 6 mm. Most of the distillation took place between 85 and 90° C. Rectification of this 859.1 gram fraction yielded 708.2 grams of β-methyl-β-cyanopropyltrichlorosilane which boiled at 88° C. at 8 mm. and had a refractive index $n_D^{20}$ 1.4595. Analysis of the product showed it to contain 52.1% chlorine; and 6.85% nitrogen. (Theoretical: 52.5% chlorine; 6.9% nitrogen.)

Example 3

α-Cyanoethyltrichlorosilane was prepared by charging a high-pressure steel bomb with 630.0 grams (4.65 moles) of trichlorosilane and 130.0 grams (2.45 moles) of acrylonitrile and heating at 200° C. for six hours. Rectification of the reaction product yielded 28.8 grams of α-cyanoethyltrichlorosilane which boiled between 64 and 66° C. at 6 mm. Chemical analysis of the product showed it to contain 7.19% nitrogen and 56.6% chlorine. (Theoretical: 7.43% nitrogen; 56.43% chlorine.)

Example 4

Methyl-β-cyanoethyldichlorosilane was prepared by adding 0.50 mole methylmagnesium bromide in 200 ml. ether to a stirred solution of 94.3 grams (0.50 mole) β-cyanoethyltrichlorosilane in 200 ml. ether. The β-cyanoethyltrichlorosilane had been prepared by the method of Example 1. The solution was refluxed for one hour and then filtered. Upon standing the reaction product separated into an upper ether layer and a lower ether-insoluble layer. The ether was distilled off the upper layer and the residue from the ether distillation and the ether insoluble layer were combined and then fractionally distilled to yield 11.6 grams methyl-β-cyanoethyldichlorosilane which boiled between 94° C. at 12 mm. and 102.5° C. at 14 mm. This material had a refractive index of about $n_D^{20}$ 1.4578. Chemical analysis showed the product to contain 8.24% nitrogen and 41.8% chlorine. (Theoretical: 8.3% nitrogen; 42.2% chlorine.)

Example 5

Methyl-β-cyanoethyldichlorosilane was prepared by refluxing 131 grams (0.92 mole) dimethylcadmium, 320 grams (1.7 moles) β-cyanoethyltrichlorosilane, and 600 ml. toluene under nitrogen with stirring for 9 hours. A granular precipitate, probably methyl cadmium chloride, was first formed. This first precipitate was replaced as the reaction proceeded by a fine, slightly yellow precipitate of cadmium chloride. The mixture was filtered under nitrogen and the filtrate was fractionally distilled to give methyl-β-cyanoethyldichlorosilane which boiled at 128.5° C. at 50 mm. had a refractive index $n_D^{20}$ 1.4571 and a density $d_4^{20}$ 1.2015. Analysis of this material showed it to contain 28.7% carbon, 4.3% hydrogen, 42.4% chlorine. (Theoretical: 28.6% carbon, 4.2% hydrogen, 42.2% chlorine.) The product was found to have a molar refractivity $MR_D$ 38.12 as compared with the calculated value $MR_D$ 38.46.

Example 6

Methyl-β-cyanoethyldimethoxysilane was prepared by adding 98 grams (0.58 mole) of methyl-β-cyanoethyldichlorosilane dropwise with stirring, over a period of 2 hours, to a solution of 94 grams (1.17 moles) of pyridine in 500 ml. of methyl alcohol which had been cooled in an ice bath. At the end of this time, most of the methanol was stripped off under vacuum and 800 ml. benzene was added. The precipitate of pyridine hydrochloride was filtered off and the filtrate was distilled, yielding 38.5 grams of methyl-β-cyanoethyldimethoxysilane which boiled between 89.5 to 90.5° C. under 8 mm. and had a refractive index $n_D^{20}$ 1.4192 and a density $d_4^{20}$ 0.9862. This product was found to have a molar refractivity $MR_D$ 40.80 as compared with the calculated value of 40.72. Chemical analysis of the product showed it to contain 45.6% carbon and 8.1% hydrogen. (Theoretical: 45.3% carbon and 8.2% hydrogen.)

Example 7

β-Cyanoethyltrimethoxysilane may be prepared by refluxing 1 mole of acrylonitrile with about 1 mole of trichlorosilane in the presence of about 0.05 mole of tri-n-butylamine to form β-cyanoethyltrichlorosilane. The β-cyanoethyl trichlorosilane may then be added to a solution of pyridine in methanol to form β-cyanoethyltrimethoxysilane which may be purified as in Example 6.

Example 8

Methyl-β-cyanoethyldiacetoxysilane was prepared by distilling a mixture of 52 grams (0.31 mole) of methyl-β-cyanoethyldichlorosilane, 71 grams (0.7 mole) of acetic anhydride and 0.3 ml. of triethanolamine slowly through a fractionating column at such a rate that acetyl chloride was removed as fast as it was formed. When all of the acetyl chloride had been removed, the residue was distilled under reduced pressure, yielding 45.6 grams of methyl - β - cyanoethyldiacetoxysilane which boiled at 133° C. under 5 mm. and had a refractive index $n_D^{20}$ 1.4326 and a density $d_4^{20}$ 1.1193. The molar refractivity of this compound was found to be $MR_D$ 49.93 as compared with the calculated value $MR_D$ 49.98. Chemical analysis of the product showed it to contain 44.3% carbon and 6.3% hydrogen. (Theoretical: 44.6% carbon and 6.1% hydrogen.)

Although in the examples above, R has been illustrated only as the methyl radical, it is understood that R may be hydrogen or a higher straight-chain or branched-chain alkyl radical, or an aryl radical, or a radical having both aryl and alkly groups. In addition, R may be substituted radicals having, for example, halogen atoms, nitro groups, and the like attached to carbon. Although R' has been illustrated only as hydrogen and methyl radical, it will be understood to those skilled in the art that R" may be any alkyl radical or aryl radical. Although the examples show only one cyanoalkyl radical attached to silicon, it should be understood that the value of b may be 2, providing two cyanoalkyl radicals attached to one silicon.

What I claim as new and desire to secure by Letters Patent of the United States is:

1. Organosilanes having at least one $$-(CH_2)_n-CH(CN)R'$$

radical attached to silicon where R' is a member selected from the class consisting of hydrogen, alkyl, radicals, aryl radicals, and aralkyl radicals, and n is a whole number equal to from 1 to 10, inclusive, and at least one hydrolyzable group attached directly to silicone, with any remaining valences of silicon being satisfied by members selected from the class consisting of hydrogen, alkyl radicals, aryl radicals and aralkyl radicals.
2. Methyl-β-cyanoethyldimethoxysilane.
3. Methyl-β-cyanoethyldichlorosilane.
4. β-Cyanoethyltrimethoxysilane.
5. β-Cyanopropyltrichlorosilane.
6. β-Cyanoethyltrichlorosilane.
7. A cyanoalkyl silane containing at least one silicon-bonded β-cyanoalkyl radical and at least one silicon-bonded hydrolyzable group, any remaining valences of silicon being satisfied by members selected from the class consisting of hydrogen, alkyl radicals, and aryl radicals.
8. Organosilanes of the formula

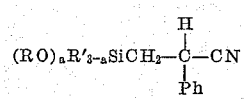

wherein R and R' are members selected from the group consisting of alkyl and aryl radicals, Ph is the phenyl radical, and $a$ is an integer from 1 to 3, inclusive.

References Cited by the Examiner
UNITED STATES PATENTS

| | | | |
|---|---|---|---|
| 2,524,529 | 10/50 | Krieble | 260—448.2 |
| 2,557,802 | 6/51 | Sommer | 260—448.2 |
| 2,570,462 | 10/51 | Lipscomb | 260—448.2 |
| 2,632,013 | 3/53 | Wagner et al. | 260—448.2 |
| 2,637,738 | 5/53 | Wagner | 260—448.2 |
| 2,687,418 | 8/54 | Sommer | 260—448.2 |
| 2,721,873 | 10/55 | MacKenzie et al. | 260—448.2 |
| 2,776,306 | 1/57 | Cole | 260—448.2 |

FOREIGN PATENTS
961,878  5/50  France.

OTHER REFERENCES
Hauser et al.: "Jour. Am. Chem. Soc.," vol. 74 (1952), page 5092.

TOBIAS E. LEVOW, *Primary Examiner.*
EARL W. HUTCHISON, ALLAN M. BOETTCHER, ALPHONSO D. SULLIVAN, *Examiners.*